US012671711B2

(12) United States Patent
Bonney

(10) Patent No.: US 12,671,711 B2
(45) Date of Patent: Jun. 30, 2026

(54) SYSTEMS AND METHODS FOR ANALYSIS AND CLASSIFICATION OF DATA SECURITY MEASURES AND DATA INTEGRITY

(71) Applicant: STATE FARM MUTUAL AUTOMOBILE INSURANCE COMPANY, Bloomington, IL (US)

(72) Inventor: Molly Bonney, Mabank, TX (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 168 days.

(21) Appl. No.: 18/235,246

(22) Filed: Aug. 17, 2023

(65) Prior Publication Data

US 2024/0396920 A1 Nov. 28, 2024

Related U.S. Application Data

(60) Provisional application No. 63/469,182, filed on May 26, 2023.

(51) Int. Cl.
| | |
|---|---|
| *H04L 9/40* | (2022.01) |
| *G06F 21/62* | (2013.01) |
| *G06F 21/64* | (2013.01) |

(52) U.S. Cl.
CPC ...... *H04L 63/1433* (2013.01); *G06F 21/6245* (2013.01); *G06F 21/64* (2013.01)

(58) Field of Classification Search
CPC ... H04L 63/1433; G06F 21/6245; G06F 21/64
USPC ...................................................... 726/22, 25
See application file for complete search history.

(56) References Cited

U.S. PATENT DOCUMENTS

| | | | | |
|---|---|---|---|---|
| 2009/0024663 A1* | 1/2009 | McGovern | ............ | G06F 21/577 |
| 2016/0234247 A1* | 8/2016 | Ng | ........................ | G06Q 40/08 |
| 2017/0134418 A1* | 5/2017 | Minoli | ................ | H04L 63/1433 |
| 2019/0065754 A1* | 2/2019 | Ochs | ..................... | G06F 21/577 |
| 2019/0207981 A1* | 7/2019 | Sweeney | ............... | H04L 41/145 |
| 2021/0073678 A1* | 3/2021 | Chu | ........................ | G06N 3/045 |
| 2021/0211454 A1* | 7/2021 | Boyer | .................... | H04L 67/53 |

(Continued)

OTHER PUBLICATIONS

NPL Search Terms (Year: 2025).*
NPL Search Terms (Year: 2026).*

*Primary Examiner* — Syed A Zaidi
(74) *Attorney, Agent, or Firm* — MARSHALL, GERSTEIN & BORUN LLP

(57) ABSTRACT

The present aspects may relate to techniques for a reliable and trusted evaluation and rating of an entity's (e.g., company) data security and ethical use of user's data. The novel methods and systems of evaluation and rating of data security and ethical use of user's data discussed herein improve user experience (whether individual or organizational) by giving customers an objective evaluation that private or sensitive data is being handled correctly. The method may include (i) receiving a request to evaluate data security operations of one or more computer systems of an entity that have access to private data of one or more users; (ii) determining one or more data security factors for the entity describing storage, security, and sharing of the private data by the entity; (iii) generating a data security score based upon the data security factors using a data security model; and/or (iv) outputting the data security score.

21 Claims, 3 Drawing Sheets

(56)                    References Cited

U.S. PATENT DOCUMENTS

2023/0153150 A1 *   5/2023  Kozlowski ............. H04L 63/20
                                                718/108
2025/0088538 A1 *   3/2025  Saripalli ................ H04L 63/20

* cited by examiner

300

RECEIVE A REQUEST TO EVALUATE DATA SECURITY OF AN ENTITY — 302

DETERMINE DATA SECURITY FACTORS FOR THE ENTITY — 304

DETERMINE HISTORIC DATA SECURITY FACTORS FOR THE ENTITY — 306

PERFORM A SECURITY ANALYSIS OF THE ENTITY'S COMPUTER SYSTEMS — 308

GENERATE A DATA SECURITY SCORE FOR THE ENTITY — 310

OUTPUT DATA SECURITY SCORE FOR THE ENTITY — 312

SYSTEMS AND METHODS FOR ANALYSIS AND CLASSIFICATION OF DATA SECURITY MEASURES AND DATA INTEGRITY

CROSS-REFERENCE TO RELATED APPLICATIONS

This application claims priority to and the benefit of the filing date of provisional U.S. Patent Application No. 63/469,182 entitled "Systems and Methods for Analysis and Classification of Data Security Measures and Data Integrity," filed on May 26, 2023. The entire contents of which is hereby expressly incorporated herein by reference.

FIELD OF THE DISCLOSURE

Systems and methods are disclosed for analyzing and classifying data security systems, procedures, and measures.

BACKGROUND

Data security and data privacy may be complex and include multifaceted issues that concern the collection, use, and protection of personal information. Some issues that may be of current concern to users and consumers are the unauthorized use and exposure of personal, confidential, and private data such as personal identifying information, financial data, and healthcare data. Users and consumers may often lack a clear way to determine if a company is ethical with collection, storage, and usage personal, confidential, and private data.

The systems and methods disclosed herein provide solutions to these problems and may provide solutions to the ineffectiveness, insecurities, difficulties, inefficiencies, encumbrances and/or other drawbacks of conventional techniques.

SUMMARY

The present aspects may relate to, inter alia, to techniques for a reliable and trusted evaluation and rating of an entity's (e.g., company) data security and ethical use of user's data. The novel methods and systems of evaluation and rating of data security and ethical use of user's data discussed herein improve user experience (whether individual or organizational) by giving customers an objective evaluation that private or sensitive data is being handled correctly and may incentivize the entities to handle their data securely and ethically.

In one aspect, a computer-implemented method for evaluating data security may be provided. The method may be implemented via one or more local or remote processors, transceivers, sensors, servers, memory units, mobile devices, wearables, virtual reality headsets, augmented reality or smart glasses, bots (such as voice bots, chatbots, ChatGPT-based bots, etc.), and/or other electronic or electric components. In one instance, the method may include (such as via one or more processors and associated transceivers) (i) receiving a request to evaluate data security operations of one or more computer systems of an entity that have access to private data of one or more users; (ii) determining one or more data security factors for the entity describing storage, security, and sharing of the private data by the entity; (iii) generating a data security score based upon the data security factors using a data security model; and/or (iv) outputting the data security score. The process may include additional, less, or alternate functionality, including that discussed elsewhere herein.

In another aspect, computing system for evaluating data security may be provided. The system may include one or more local or remote processors, transceivers, sensors, servers, memory units, mobile devices, wearables, virtual reality headsets, augmented reality or smart glasses, bots (such as voice bots, chatbots, ChatGPT-based bots, etc.), and/or other electronic or electric components. In one instance, the system may include one or more processors; and one or more memories having stored thereon computer-executable instructions that, when executed by the one or more processors, cause the computing system to: (i) receive a request to evaluate data security operations of one or more computer systems of an entity that have access to private data of one or more users; (ii) determine one or more data security factors for the entity describing storage, security, and sharing of the private data by the entity; (iii) generate a data security score based upon the data security factors using a data security model; and/or (iv) output the data security score. The computing system may include additional, less, or alternate actions, including those discussed elsewhere herein.

In yet another aspect, a non-transitory computer-readable medium having stored thereon computer-executable instructions, that when executed, may cause a computer to: (i) receive a request to evaluate data security operations of one or more computer systems of an entity that have access to private data of one or more users; (ii) determine one or more data security factors for the entity describing storage, security, and sharing of the private data by the entity; (iii) generate a data security score based upon the data security factors using a data security model; and/or (iv) output the data security score. The computer-readable medium may include instructions that direct additional, less, or alternate functionality, including that discussed elsewhere herein.

Advantages will become more apparent to those of ordinary skill in the art from the following description of the preferred aspects, which have been shown and described by way of illustration. As will be realized, the present aspects may be capable of other and different aspects, and their details are capable of modification in various respects. Accordingly, the drawings and description are to be regarded as illustrative in nature and not as restrictive.

The figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

Overall, data privacy is an essential issue that requires ongoing attention and action to protect individuals' personal information and prevent harm. Techniques, systems, apparatuses, components, devices, and methods are disclosed for, inter alia, providing a reliable and trusted evaluation and rating of an entity's (e.g., company) ethical use of user's data. A data security evaluation system may gather and determine, for an entity, current data security protocols, methods, and system and historical data for the security and privacy of data. The gathered data may be applied to a data security model that outputs a data security score for the entity. The data security score may represent a strength or robustness of the data security of the entity.

By using a data security score, entities (e.g., companies, corporations, organizations, agencies, etc.) may have a marketing tool, which gives customers reassurance that private or sensitive data is being handled correctly and may incentivize the entities to handle their data ethically. Likewise, users and customers may rely on entities adhering to the requirements for a data security score to handle private or sensitive data accordingly. Additionally, IT companies may integrate adherence with their data product offerings giving them a strategic advantage over other products.

Exemplary System

Figure 1:
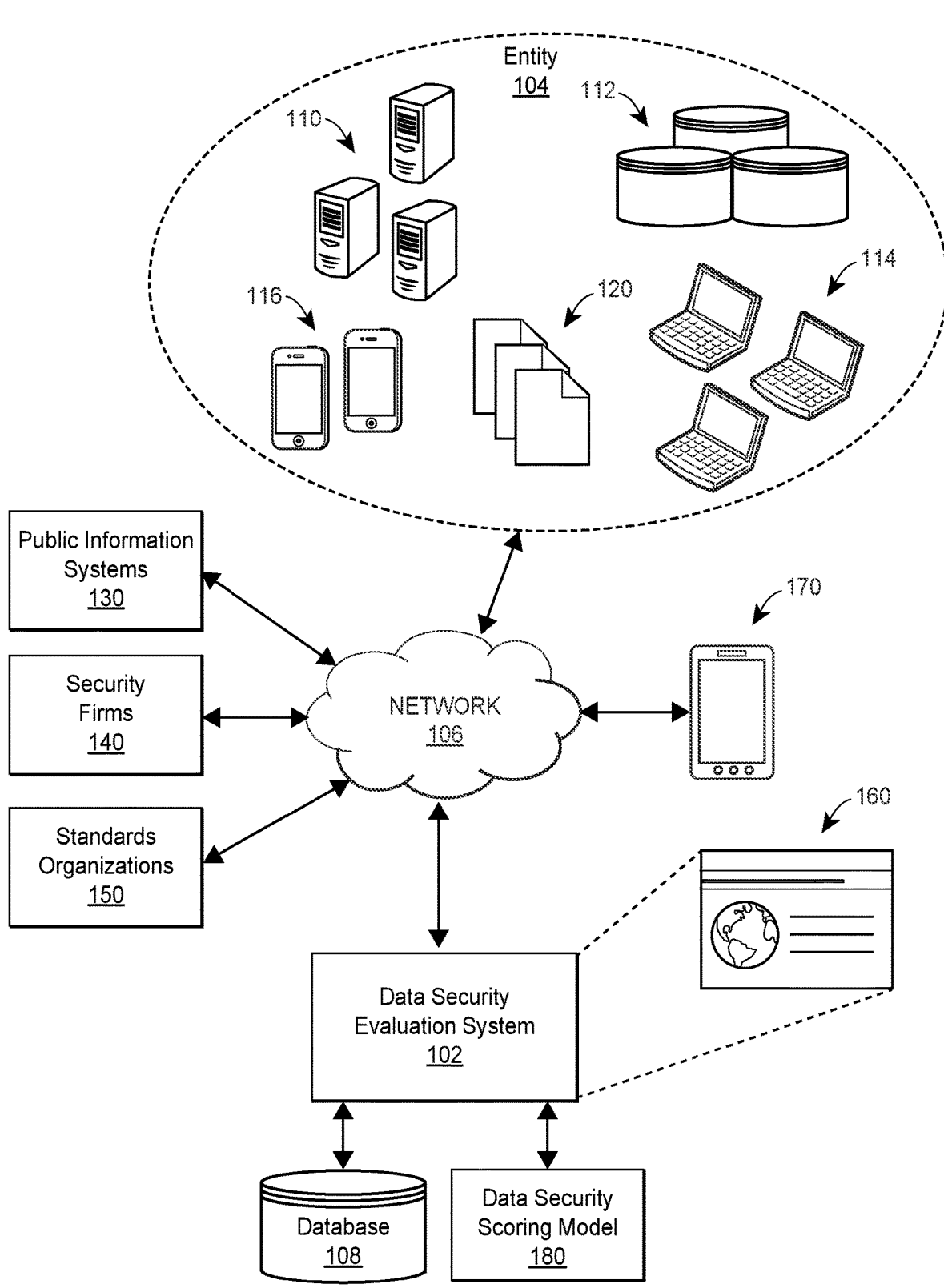
FIG. 1 depicts an exemplary network environment in which data security may be evaluated.

FIG. 1 depicts an exemplary network environment 100 for evaluating and classifying data security measures, in accordance with various aspect of the present disclosure. While FIG. 1 illustrates various components, systems, and entities that may be included in the network environment 100, additionally components, systems, and entities may be added and components, systems, and entities, which are illustrated, may be removed.

As illustrated in FIG. 1, the network environment 100 may include a data security evaluation system 102. The data security evaluation system 102 may be configured to analyze, classify, and report the data security of an entity 104. The data security evaluation system 102 may be configured to determine the data security operations of the entity 104. The data security operations may include security measures, processes, procedures, and standards implemented by the entity 104 to protect data received, transmitted, and stored by the entity 104. The data security operations may also include data ethics adhered to by the entity 104. The data ethics may include protocols, processes, procedures, and standards defining how the entity 104 stores data, retains data, and shares data with third parties.

The entity 104 may be any type of company, corporation, organization, governmental body, etc. that collects, stores, and maintains data 120 that may be considered sensitive. For example, the entity 104 may be an online retailer that collects and maintains personal and financial data of users shopping with the online retailer. In another example, the entity 104 may be a healthcare provider that collects and maintains person, healthcare, and financial data of patients.

The data 120 may be any type of third-party data (e.g., user data, customer data, consumer data, patient data, employee data, etc.), which may collected, obtained, stored, and used by the entity 104. The data 120 may include data that is private, confidential, secret, and personal to the owner of the data and not intended for public access or viewing. The data 120 may include personal identifying information (PII) such as social security number, driver's license number, date of birth, address, etc. The data 120 may include financial data such as credit card numbers, tax records, bank account information, and the like. The data 120 may include healthcare data such as medical records, medication lists, diagnoses, insurance records, and the like. The data 120 may include personal information such as Internet browsing history, media viewing habits, political affiliations, and the like.

Due to data privacy and sensitivity concerns of the data 120, the entity 104 may be required to protect the data 120 collected and stored on computer systems, to control access to the data 120, to control dissemination of the data 120, and to control storage and removal of the data 120. For example, the computer systems of the entity 104 may be subject to data breaches. A data breach is an incident in which sensitive, confidential, or protected data is accessed or stolen by unauthorized individuals. Data breaches may result in significant harm to individuals associated with the stolen data, including identity theft, financial loss, and reputational damage. The computer systems of the entity 104 may also be subject to unauthorized access to personal data. For example, the data collected by the entity 104 may include personal data that is collected for a specific purpose, for instance, a credit card number of an online purchase, heath care data associated with a doctor visit, etc. The data 120 may be accessed without consent or authorization of the owner of the data and outside the allowed usage of the data, for example, by hackers, government agencies, and employees of the entity 104, that collect the data. The unauthorized access may lead to users being monitored or targeted for advertising, political purposes, or even criminal activities.

In addition to the unauthorized access of the data, the entity 104 may adhere to data ethics that are not acceptable to all users. The entity 104 may not be properly securing the data 120 or not clearly informing owner of the data 120 of its usage. For example, the entity 104 may not always be transparent about what type of the data 120 may be collected, how the data 120 is being used, and what other entities acquire the data 120. The lack of transparency may make it difficult for owners of the data 120 to understand and control access to the data 120. For example, the data 120 may be shared among different organizations, including third-party vendors and partners, without the owner's knowledge or consent, which may result in the data being used for purposes not anticipated or authorized. The entity 104 may not have adequate security measures and security policies in place to protect the data 120 from cyberattacks, data breaches, or unauthorized access. The entity 104 may also use the data 120 in a discriminatory manner. For example, the data 120 may be used to discriminate against individuals based upon race, gender, age, or other protected characteristics. Additionally, biased algorithms used by the entity 104 may use the data 120 to perpetuate or amplify the misusage. The entity 104 may also use the data 120 to monitor and track individuals, leading to concerns about privacy, safety, and civil liberties.

To assess the data security and integrity of the entity 104, the data security evaluation system 102 may be configured to assess the data security of the entity 104 and provide an indication, a score, and/or rating of the entity's data security level (data security score). To assess the data security of the entity 104, the data security evaluation system 102 may determine and evaluate various data security factors that concern the security and privacy of the data 120. The factors may include the data security history of the entity 104, the current data security process, systems, and procedures implemented by the entity 104, the sensitivity of the data 120, and the exposure of the data 120. For example, the data security evaluation system 102 may include a set of computer executable instructions that assess the data security of the entity 104 and provide an indication, a score, and/or rating of the entity's data security level (data security score), as described below in FIG. 2.

The data security evaluation system 102 may communicate with the entity 104 and the systems of the entity 104 in order to evaluate the integrity and security of the data of the entity 104 data security via a network 106. The data security evaluation system 102 may communicate with the systems of the entity 104 to determine the data protection protocols of the entity 104, the data security systems of the entity 104, and the data usage policies of the entity 104. The entity 104 may supply the data security factors to the data security evaluation system 102. The data security evaluation system 102 may perform scans, surveillance, and reviews of the computer systems of the entity 104.

The systems of the entity 104 may include any computer systems and components (hereinafter generally entity computer systems) where data may be stored and accessed. For example, the entity 104 may include server computers 110, databases 112, computer systems 114, and mobile devices 116. The server computer 110 may be a computer or a system that provides services or resources to other computers or devices on a network. The server 110 may be designed to handle specific tasks and respond to requests from client devices, for example, computer systems 114 and mobile devices 116. The server computers 110 may include, for example, one or more web servers, which deliver web pages and other web content to clients over the internet; one or more file servers, which store and manage files that may be accessed by client devices on a network; one or more database servers, which stores and manages the databases 112 and provide access to data for applications; one or more mail servers, which handle sending, receiving, and storage of email messages; one or more game servers, which multiplayer online games, managing player interactions, game logic, and data storage; one or more Domain Name System (DNS) servers, which translate domain names into internet protocol (IP) addresses; one or more virtual private servers, which are virtualized servers that runs on a physical server, allowing multiple virtual servers to coexist on the same hardware; one or more file transfer protocol (FTP) servers, which facilitate file transfers between devices and the servers; one or more chat servers, which enable real-time communication between multiple users, facilitating instant messaging or chat room functionality; and the like.

The databases 112 may be an organized collection of structured data that is stored and managed on the computer systems of the entity 104. The database 112 may include one or more relational databases, which store data in tables with rows and columns, and the relationships between tables are established using keys; one or more abstract databases, which are designed to handle unstructured or semi-structured data and provide flexible data models; one or more object-oriented databases, which store data in the form of objects including attributes and methods; one or more graph database, which store data in a graph structure, representing entities as nodes and their relationships as edges; one or more time-series databases, which store time-stamped data, such as sensor readings, financial market data, or server logs; one or more spatial databases; one or more spatial database, which store spatial or geographic data, such as maps, GPS coordinates, or geographical boundaries; one or more data warehouses, which may operate as centralized repository that integrates data from multiple sources to support business intelligence and analytics; one or more in-memory (local) databases, which store data primarily in a random access memory (RAM) of a computer for faster access and processing; and the like.

The computer systems 114 and the mobile devices 116 may be associated with (e.g., in the possession of, configured to provide secure access to, etc.) a particular user, who may be accessing the systems of the entity 104 including the data 120 controlled by the entity 104. The computer systems 114 may a computing device of the entity 104 and used by individuals associated with the entity 104 (employees, contractors, third-party vendors, etc.), such as laptop computers, desktop computers, thin clients, tablets, terminals, or any other suitable computer system. Mobile devices 116 may be a personal computing device of individuals associated with the entity 104 (employees, contractors, third-party vendors, etc.), such as a mobile device, smartphone, a tablet, smart contacts, smart glasses, smart headset (e.g., augmented reality, virtual reality, or extended reality headset or glasses), smart watch, wearable, or any other suitable device or combination of devices (e.g., a smart watch plus a smartphone) with wireless communication capability.

When communicating with the computer systems of the entity 104, the data security evaluation system 102 perform scans, surveillance, and reviews of the computer systems of the entity 104. The data security evaluation system 102 may retrieve the data security, retention, and storage policies. The data security evaluation system 102 may determine the type of the data 120 (e.g., PII, financial, etc.) and sensitivity of the data 120.

With the foregoing, the data security evaluation system 102 may have access to the data 120, which may be private and/or confidential. As such, the data security evaluation system 102 may request affirmative consent from the owner of the data 120 prior to the retrieval, viewing, and/or storage of the data. After the owner provides their affirmative consent, the data security evaluation system 102 may access, process, and/or store the data 120 in accordance with the owner's permission or affirmative consent. The data security evaluation system 102 may utilize anonymization procedures and processes to mask the owner of the data 120 from users of the data security evaluation system 102. The data security evaluation system 102 may implements policies and procedures that limit and/or prevent the storage of the data 120 within the data security evaluation system 102.

The data security evaluation system 102 may scan the computer systems of the entity 104 to determine the security measures and vulnerabilities of the computer systems of the entity 104. A vulnerability scan may be a proactive security assessment technique used to identify vulnerabilities or weaknesses in computer systems, networks, or applications of the entity 104. The scan may determine potential security flaws that could be exploited by attackers to gain unauthorized access, disrupt services, or compromise data. During a vulnerability scan, specialized scanning tools and/or software may be employed to systematically examine the computer systems of the entity 104 for known security vulnerabilities. The scanning tools and/or software may compare the configurations of the computer systems, software versions, and network services against a database of known vulnerabilities. The scan may check for common misconfigurations or security best practices.

For example, the data security evaluation system 102 may determine a scope of the vulnerability scan on the computer systems of the entity 104. The scope may be predetermined for the data security evaluation system 102 and/or input by a user of the data security evaluation system 102. The scope may include specific IP ranges, subnets, or individual network identifications of the server computers 110, databases 112, computer systems 114, and mobile devices 116 to be tested. The scope may also include the goals of the scan, for example, identifying vulnerabilities in critical systems, such as the databases 112 storing the data 120, and/or assessing the overall security of the server computers 110, databases 112, computer systems 114, and mobile devices 116.

The data security evaluation system 102 may also select and configure one or more vulnerability scanning tools based upon the scope of the vulnerability scan. The data security evaluation system 102 may configure the tool, specifying scan parameters like the scan type (e.g., comprehensive, quick, targeted), scanning policies, and specific security checks (e.g., software versions, open network ports, unsecure software, etc.) to be performed. The selection and configuration may be predetermined for the data security evaluation system 102 and/or input by a user of the data security evaluation system 102.

Once the tools are selected and configured, the data security evaluation system 102 may conduct, using the tools, reconnaissance to gather information about the server computers 110, databases 112, computer systems 114, and mobile devices 116 of the entity 104. The data security evaluation system 102 may perform DNS queries, WHOIS lookups, or use other techniques to obtain details about the infrastructure, IP addresses, domain names, and network architecture of the server computers 110, databases 112, computer systems 114, and mobile devices 116 of the entity 104. The data security evaluation system 102 may scan the server computers 110, databases 112, computer systems 114, and mobile devices 116 of the entity 104 to identify active hosts, open ports, and running services using techniques such as port scanning (e.g., TCP, UDP), service fingerprinting, and operating system detection to build a detailed inventory of the server computers 110, databases 112, computer systems 114, and mobile devices 116 of the entity 104.

After scanning, the data security evaluation system 102 may access a database of known vulnerabilities. The data security evaluation system 102 may match the collected information against the database of known vulnerabilities to identify potential vulnerabilities and weaknesses in the server computers 110, databases 112, computer systems 114, and mobile devices 116 of the entity 104. For example, the data security evaluation system 102 may identify vulnerabilities based upon installed software versions, configuration settings, and presence of default or weak credentials. The data security evaluation system 102 may validate the identified vulnerabilities to ensure the identified vulnerabilities are false positives, for example, may separately recheck the server computers 110, databases 112, computer systems 114, and mobile devices 116 of the entity 104 for the identified vulnerability.

The data security evaluation system 102 may assess the identified vulnerabilities based upon their severity, potential impact, and exploitability. The data security evaluation system 102 may categorize and rate the identified vulnerabilities using a common framework and/or rating like the Common Vulnerability Scoring System (CVSS), which assigns a score to each vulnerability based upon the most critical and high-risk vulnerabilities.

To assess the data ethics of the entity 104, the data security evaluation system 102 may communicate with other computer systems via the network 106, such as public information systems 130, security firms 140, and standards organizations 150, to determine the data security factors related to data ethics and historical performance of the entity 104. The data security evaluation system 102 may communicate with the public information systems 130 and the standard organizations 150. The public information system 130 may include web sites, search engines, news sources, governmental sources, social media platforms, and the like. The standard organization 150 may include any public or private entity that governs the security and handling of private, confidential, or secret data. The data security evaluation system 102 may determine historical data security information about the entity 104. For example, the data security evaluation system 102 may determine past data breaches for the entity 104, customer or consumer rating for the entity 104, previous violations of law or policy by the entity 104, compliance with data security standards, and the like.

The data security evaluation system 102 may communicate with security firms 140 to determine the data security system, methods, and protocols used by the entity 104. The security firms 140 may manage security for the entity 104 and maintain details of the security. The security firms 140 may actively scan the security of computer systems of the entity 104. The data security evaluation system 102 may communicate with a database 108. The database 108 may store the data security factors for the entity 104. The database 108 may also store current or past data security scores for the entity 104.

Once the data security factors are determined, the data security evaluation system 102 may generate a data security score. The data security evaluation system 102 evaluates the data security factors determined for an entity and calculates a data security score for the entity. The data security evaluation system 102 may employ a data security scoring model 180. The data security scoring model 180 operates to accept, as input, the data security factors for the entity and generate a data security score that is representative of the data security of the entity 104, as described below in FIG. 2.

For example, the data security scoring model 180 may include a security layer that accepts, as an input, the security protocols, procedures, and methods of the entity 104, the identified vulnerabilities in the computer systems of the entity 104, the number of past data breaches for the entity 104, and the like. The security layer may output a security rating that represents a data security level of the entity 104. For example, the security rating may represent the likelihood the entity 104 may be subject to a data breach. The data security scoring model 180 may also include an ethics layer that receives, as input, the data sharing, retention, and storage protocols and procedures. The ethics layer may output an ethics rating that represents a data ethics level of the entity 104. For example, the ethics rating may represent the likelihood the entity 104 may retain and store sensitive data, share sensitive data with third parties, and the like. The data security scoring model 180 may combine the data security level and data ethics level to generate the data security score. For example, the data security score may be a combination of the data security level and data ethics level, each being weighted according to its importance.

Once the data security score has been determined, the data security evaluation system 102 may output the data security score via an interface 160. The interface 160 may be accessible via the network 106. For example, the entity 104 of FIG. 1 may access the data security score via the interface 160. The interface 160 may display the data security score, the data security factors, and an explanation of the data security factors to the data security score. The data security evaluation system 102 may also provide a link, reference, or widget that may direct other users (e.g., customers, clients, etc.) to the interface 160. The data security score may output an alpha-numeric score, e.g., 0 to 100, where a higher numerical value represents higher data protection and security, for example, adherence to data privacy standards, vulnerability scanning, robust network and data security measures, little or no data breaches, and the like.

The interface 160 may also be accessed by one or more user devices 170. The user devices 170 may be personal computing device of third-party individuals that desire to review or view the data security rating and may include a mobile device, a smartphone, a tablet, one or more smart contacts, smart glasses, a smart headset (e.g., augmented reality, virtual reality, or extended reality headset or glasses), a smart watch, a wearable, or any other suitable device or combination of devices (e.g., a smart watch plus a smartphone) with wireless communication capability.

Figure 2:
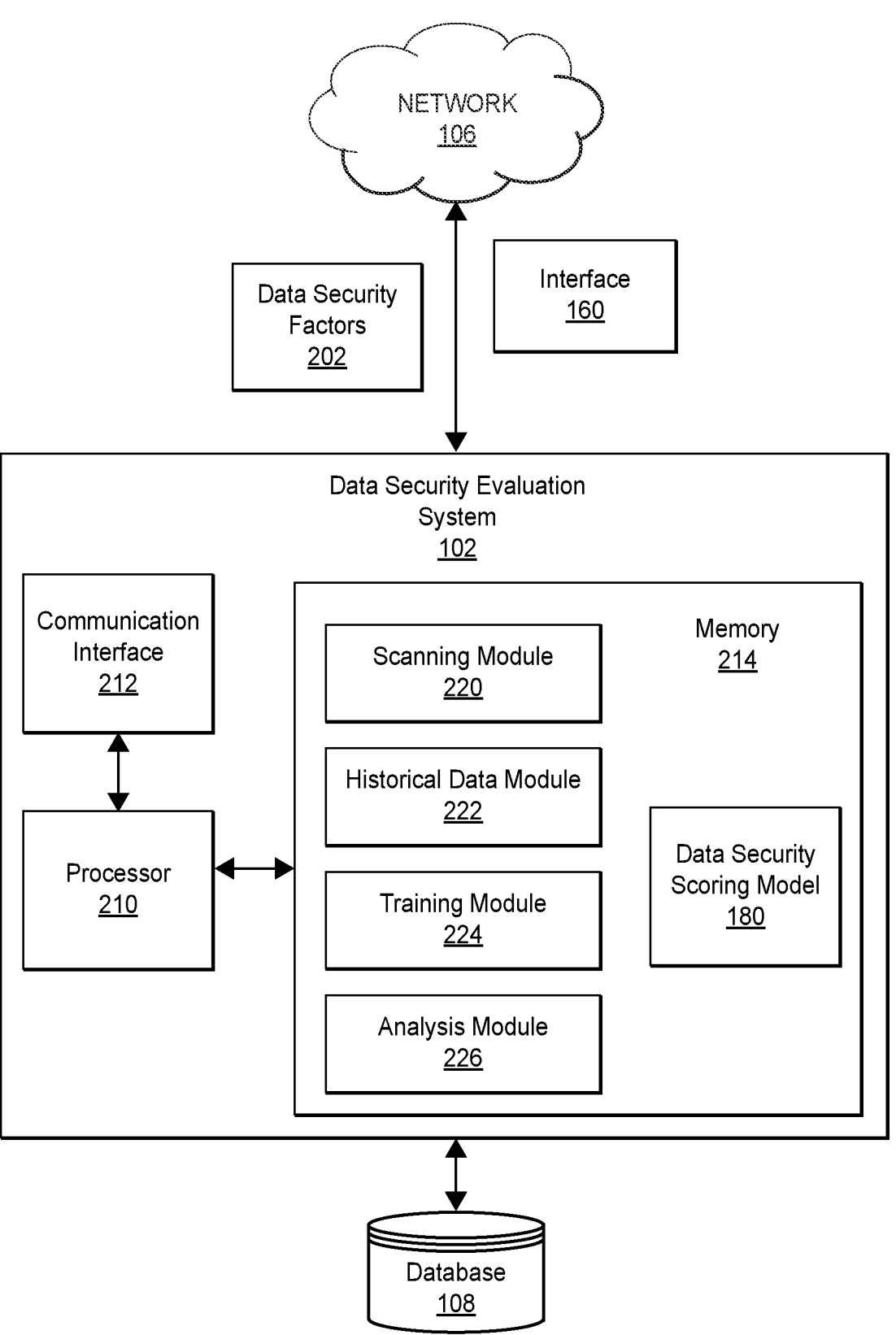
FIG. 2 depicts an exemplary computer system that facilitates communication, data gathering, and analysis implementing a data security evaluation.

FIG. 2 depicts an example of the data security evaluation system 102, in accordance with various aspects of the present disclosure. While FIG. 2 illustrates various components, systems, and entities that may be included in the data security evaluation system 102, additionally components, systems, and entities may be added and components, systems, and entities, which are illustrated, may be removed.

As illustrated, the data security evaluation system 102 may include a processor 210, a communication interface 212 and a memory 214. The processor 210 may include any suitable number of processors and/or processor types. The processor 210 may include one or more suitable processors (e.g., central processing units (CPUs) and/or graphics processing units (GPUs)). The processor 210 may be connected to the memory 214 via a computer bus (not depicted) responsible for transmitting electronic data, data packets, or otherwise electronic signals to and from the processor 210 and memory 214 in order to implement or perform the machine-readable instructions, methods, processes, elements or limitations, as illustrated, depicted, or described for the various flowcharts, illustrations, diagrams, figures, and/or other disclosure herein. The processor 210 may interface with the memory 214 via a computer bus to execute an operating system (OS) and/or computing instructions contained therein, and/or to access other services/aspects. For example, the processor 210 may interface with the memory 214 via the computer bus to create, read, update, delete, or otherwise access or interact with the data stored in the memory 214 and/or a database 108.

The memory 214 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. The memory 214 may store an operating system (OS) (e.g., Microsoft Windows, Linux, UNIX, MacOS, etc.) capable of facilitating the functionalities, apps, methods, or other software as discussed herein.

In general, a computer program or computer based product, application, or code (e.g., the model(s), such as artificial intelligence (AI) and/or machine learning (ML) models, or other computing instructions described herein) may be stored on a computer usable storage medium, or tangible, non-transitory computer-readable medium (e.g., standard random access memory (RAM), an optical disc, a universal serial bus (USB) drive, or the like) having such computer-readable program code or computer instructions embodied therein, wherein the computer-readable program code or computer instructions may be installed on or otherwise adapted to be executed by the processor 210 (e.g., working in connection with the respective operating system in memory 214) to facilitate, implement, or perform the machine readable instructions, methods, processes, elements or limitations, as illustrated, depicted, or described for the various flowcharts, illustrations, diagrams, figures, and/or other disclosure herein. In this regard, the program code may be implemented in any desired program language, and may be implemented as machine code, assembly code, byte code, interpretable source code or the like (e.g., via Golang. Python, C, C++, C #, Objective-C, Java, Scala, ActionScript, JavaScript, HTML, CSS, XML, etc.).

The database 108 may be a relational database, such as Oracle, DB2, MySQL, a NoSQL based database, such as MongoDB, or another suitable database. The database 108 may store data and be used to train and/or operate one or more ML models, chatbots, and/or voice bots. The database 108 may be local to the data security evaluation system 102. The database 108 may be remote from the data security evaluation system 102 and communicate, for example, via the network 106.

The network 106 may be a single communication network or may include multiple communication networks of one or more types (e.g., one or more wired and/or wireless local area networks (LANs), and/or one or more wired and/or wireless wide area networks (WANs) such as the internet). For example, the network 106 may include a wireless cellular service (e.g., 4G, 5G, 6G, etc.). In one aspect, the network 106 may include a cellular base station, such as cell tower(s), communicating to the one or more computer systems of the entity 104 and/or the data security evaluation system 102 via wired/wireless communications based upon any one or more of various mobile phone standards, including NMT, GSM, CDMA, UMTS, LTE, 5G, 6G, or the like. Additionally or alternatively, the network 106 may comprise one or more routers, wireless switches, or other such wireless connection points communicating to the components of the data security evaluation system 102 via wireless communications based upon any one or more of various wireless standards, including by non-limiting example, IEEE 802.11a/b/g/n/ac/ax/be (WIFI), Bluetooth, and/or the like. In some embodiments, the data security evaluation system 102 may connect to the network 106 via the communications interface 212.

As described herein and in an aspect, the functionality of the data security evaluation system 102 may be embodied in one or more servers. The one or more servers may perform the functionalities as part of a cloud network or may otherwise communicate with other hardware or software components within one or more cloud computing environments to send, retrieve, or otherwise analyze data or information described herein. For example, in certain aspects of the present techniques, the data security evaluation system 102 may comprise an on-premise computing environment, a multi-cloud computing environment, a public cloud computing environment, a private cloud computing environment, and/or a hybrid cloud computing environment. For instance, an entity (e.g., a business) providing a chatbot to enable remediation provider and/or insurance provider notification may host one or more services in a public cloud computing environment (e.g., Alibaba Cloud, Amazon Web Services (AWS), Google Cloud, IBM Cloud, Microsoft Azure, etc.). The public cloud computing environment may be a traditional off-premise cloud (i.e., not physically hosted at a location owned/controlled by the business). Alternatively, or in addition, aspects of the public cloud may be hosted on-premise at a location owned/controlled by a structure owner or lessee. The public cloud may be partitioned using visualization and multi-tenancy techniques and may include one or more infrastructure-as-a-service (IaaS) and/or platform-as-a-service (PaaS) services.

In an aspect, the memory 214 may include the scanning module 220, the historical data module 222, training module 224, and the analysis module 226 to perform the data security evaluation described herein. The scanning module 220, the historical data module 222, training module 224, and the analysis module 226 may include one or more natural language processing (NLP) modules for communicating with and/or extracting data from the data security evaluation system 102. The NLP modules may include a set of computer-executable instructions implementing NLP, natural language understanding (NLU) and/or natural language generator (NLG) functionality. The NLP modules may be responsible for transforming the user input (e.g., unstructured conversational input such as speech or text) to an interpretable format. The NLP modules may include an NLU to understand the intended meaning of utterances and/or prompts, among other things. The NLP modules may include an NLG, which may provide text summarization, machine translation, and/or dialog where structured data is transformed into natural conversational language (i.e., unstructured) for output to the user.

In one aspect, the scanning module 220, the historical data module 222, training module 224, and the analysis module 226 may include and/or communicate with voice bots or chatbots for communicating with and/or extracting data from the data security evaluation system 102. Voice bots or chatbots discussed herein may be configured to utilize AI and/or ML techniques. For instance, the voice bot or chatbot may be a ChatGPT chatbot or other ChatGPT-based bot. The voice bots or chatbots may generate human-like responses to text inputs and engage in conversations with users of the data security evaluation system 102. The voice bot or chatbot may employ supervised or unsupervised machine learning techniques, which may be followed by, and/or otherwise used in conjunction with, reinforced or reinforcement learning techniques. The voice bot or chatbot may employ the techniques utilized for ChatGPT. The voice bot or chatbot may deliver various types of output for user consumption in certain embodiments, such as verbal or audible output, a dialogue output, text or textual output (such as presented on a computer or mobile device screen or display), visual or graphical output, and/or other types of outputs.

The chatbot and/or voice bot may be programmed to simulate human conversation, interact with users, understand their needs, and recommend an appropriate line of action with minimal and/or no human intervention, among other things. The chatbot and/or voice bot may be any suitable chatbot and/or voice bot, such as a generative pre-trained transformer (GPT) chatbot. This may include providing the best response of any query that it receives and/or asking follow-up questions.

For example, a user may provide a request to the chatbot or voice bot, such as "Provide an analysis of the security operations of our computer systems." The chatbot or voice bot may then generate an output indicating the data security of the computer systems for the entity 104. For example, the chatbot or voice bot may provide a response to the request which includes a data security score and/or grade, a summary explaining the meaning of the score and/or grade, recommendations on how to improve the score and/or grade, etc.

In certain embodiments, the voice bots or chatbots discussed herein may be configured to utilize AI and/or ML techniques. For instance, the voice bot or chatbot may be a ChatGPT chatbot. The voice bot or chatbot may employ supervised or unsupervised machine learning techniques, which may be followed by, and/or used in conjunction with, reinforced or reinforcement learning techniques. The voice bot or chatbot may employ the techniques utilized for ChatGPT.

Noted above, in some embodiments, a chatbot or other computing device may be configured to implement ML, such that the chatbot or other computing device "learns" to analyze, organize, and/or process data without being explicitly programmed. ML may be implemented through ML methods and algorithms ("ML methods and algorithms").

For example, in an aspect, the data security evaluation system 102 may initiate a chat session over the network 106 with a user via the user device 170, e.g., so the user may request an analysis of the security operations of the computer systems of the entity 104. The chatbot may receive utterances from the user, i.e., the input from the user from which the chatbot needs to derive intents from. The utterances may be processed using the NLP module and/or an ML module via one or more ML models to recognize what the user says, understand the meaning, determine the appropriate action, and/or respond with language the user may understand.

In some embodiments, the ML chatbot may be based upon a large language model (LLM). Such an LLM may be trained to predict a word in a sequence of words. For example, the LLM may be trained to predict a next word following a given sequence of words (e.g., "next-token-prediction"), and/or trained to predict a "masked" (e.g., hidden) word within a sequence of given sequence of words (e.g., "masked-language-modeling"). For instance, in an example of next-token-prediction, the ML chatbot may be given the sequence "Jane is a"—and the ML chatbot may predict a next word, such as "dentist," "teacher," "mother," etc. In an example of masked-language-modeling, the ML chatbot may receive the given the sequence "Jane XYZ skiing"—and the ML chatbot may fill in XYZ with "loves," "fears," "enjoys," etc.

In some embodiments, this prediction technique may be accomplished through a long-short-term-memory (LSTM) model, which may fill in the blank with the most statistically probable word based upon surrounding context. However, the LSTM model may have the following two drawbacks. First, the LSTM model may not rate/value individual surrounding words more than others. For instance, in the masked-language-modeling example of the preceding paragraph, skiing may most often be associated with "enjoys;" however Jane in particular, may fear skiing, but the LSTM model may not be able to correctly determine this. Second, instead of being processed as a whole, the words of the input sequence may be processed individually and sequentially, thus restricting the complexity of the relationships that may be inferred between words and their meanings.

Advantageously, some embodiments overcome these drawbacks of the LSTM model by using transformers (e.g., by using a generative pre-trained transformer (GPT) model). More specifically, some embodiments use a GPT model that includes (i) an encoder that processes the input sequence, and (ii) a decoder that generates the output sequence. The encoder and decoder may both include a multi-head self-attention mechanism that allows the GPT model to differentially weight parts of the input sequence to infer meaning and context. In addition, the encoder may leverage masked-language-modeling to understand relationships between words and produce improved responses.

Such multi-head self-attention mechanism may convert tokens (e.g., strings of text, such as a word, sentence, grouping of text, etc.) into vectors representing the importance of the token in the input sequence. In some embodiments, to accomplish this, the GPT model may perform the following steps. First, query, key, and value vectors may be created for each token in the input sequence. Second, a similarity between the query vector for the token and the key vector of every other token may be calculated by taking the dot product of the two vectors. Third, normalized weights may then be generated by feeding the output of the previous step into a softmax function. Fourth, a final vector may be generated; the final vector may represent the importance of the token within the input sequence by multiplying the weights generated in the previous step by the value vectors of each token.

Furthermore, in some embodiments, rather than performing the previous four steps only once, the GPT model may iterate the steps and performs them in parallel; at each iteration, new linear projection of the query, key, and value vectors may be generated. Such iterative, parallel embodiments advantageously may improve grasping of sub-meanings and more complex relationships within the input sequence data.

Further advantageously, some embodiments may first train a basic model (e.g., a basic GPT model, etc.), and subsequently may perform any of the following three steps on the basic model: supervised fine tuning (SFT); reward modeling; and/or reinforcement learning.

In the SFT step, a supervised training dataset may be created. The supervised training dataset may have known outputs for each input so that the model may learn from the correspondences between input and outputs. For example, to train the model to generate summaries of data security scores, the supervised training dataset may have: (a) inputs of (i) data security scores, and/or (ii) data security grades; and (b) outputs summarizing the data security scores and/or grades. The supervised training dataset may be received (e.g., by the voice bot or chatbot) from any source (or combination of sources).

Training the basic model on the supervised training dataset may create the SFT model; and, subsequent to creating the SFT model, a chatbot training application may perform reward modeling. In reward modeling, the SFT may be fed input prompts, and may output multiple outputs (e.g., 2-10 outputs, etc.) for each input. The multiple outputs for each input may be achieved by, for example, randomness, or by controlling a predictability setting. A user (e.g., an administrator, an operator, etc.) may then rank the multiple outputs for each input, thus allowing the model to associate each output with a reward (e.g., a scalar value). And the ranked outputs may then be used to further train the SFT model. For instance, the SFT model may receive an input of a data security score and create seven outputs summarizing the score; the administrator may then rank the seven output summaries; and the rankings may then be fed back into the model to further train the model. Via this reward modeling step, the chatbot training application may create a policy that the model learns. The policy may comprise a strategy for the model to maximize its reward.

Subsequently, the chatbot training application may further train the model via reinforcement learning. Here, further inputs may be fed into the model, and the model then generates, based upon the policy learned during reward modeling, (i) outputs corresponding to the inputs, and (ii) rewards values (e.g., scalar values) corresponding to the input/output pairs. The rewards values may then be fed back into the model to further evolve the policy.

In some embodiments, the reward modeling and reinforcement learning steps may be iterated through any number of times.

The scanning module 220 may include a set of computer-executable instructions implementing communication functions. The scanning module 220 may operate to communicate with the computer systems of the entity 104. The scanning module 220 may operate to collect information (e.g., identify of computer systems, security information, etc.) from the computer systems of the entity 104. The scanning module 220 may perform the vulnerability scanning on the computer systems of the entity 104. The scanning module 220 may include a communication component configured to communicate, using the communications interface 212, (e.g., send and receive) data via one or more external/network port(s) to one or more networks or local terminals, such as the network 106 described herein. In one aspect, the scanning module 220 may include a client-server platform technology such as ASP.NET, Java J2EE, Ruby on Rails, Node.js, a web service or online API, responsive for receiving and responding to electronic requests. The scanning module 220 may further include or implement an operator interface configured to present information to an administrator or operator and/or receive inputs from the administrator and/or operator.

The scanning module 220 may also communicate with the security firms 140 to identify the security information and factors of the entity 104. The scanning module 220 may also communicate with the entity 104, the public information systems 130, the security firms 140, and/or the standards organization to determine the data ethics protocols and procedures of the entity 104.

The historical data module 222 may operate to collect historical security data for the entity 104. The historical data module 222 may include a set of computer-executable instructions implementing searching and data collection functions. The scanning module 220 may include a communication component configured to communicate, using the communications interface 212, with the data sources such as the public information systems 130, the security firms 140, and the standard organization 150. The historical data module 222 may operate to request historical security data related to the entity 104. For example, the historical data module 222 may request from the standard organization 150 any information that describes data or security breaches for the entity 104, describes the data disclosure and sharing history for the entity 104, describes a data security rating for the entity 104, and the like. The historical data module 222 may operate to search the public information systems 130 for information related to the data security history of the entity 104. For example, the historical data module 222 may access public search engines to search public information sources (e.g., new website, social media sites, etc.) to identify historical data security information for the entity 104 (e.g., data breaches).

The training module 224 may include a set of computer-executable instructions implementing the training of the data security scoring model 180. The training module 224 may train the data security scoring model 180 using historic data security factors. The data security scoring model 180 may be trained with historic data security factors. In some embodiments, the data security scoring model 180 may be trained with irregularities such that the data security scoring model 180 may match, compare, and/or otherwise identify impact factors based upon data security. For example, the data security scoring model 180 may be trained with various security vulnerabilities and data security configurations and the likelihood and/or severity of data security breaches associated with the vulnerabilities and data security configurations. Additionally, the data security scoring model 180 the data security scoring model 180 may be initially trained according to such using example training data and/or may be trained while in operation using particular data security factors.

In some aspects, the training module 224 may employs supervised learning, which involves identifying patterns in existing data to make predictions about subsequently received data. Specifically, the data security scoring model 180 may be "trained" using training data, which includes example inputs and associated example outputs. Based upon the training data, the data security scoring model 180 may generate a predictive function which maps outputs to inputs and may utilize the predictive function to generate ML outputs based upon data inputs. The exemplary inputs and exemplary outputs of the training data may include any of the data inputs or ML outputs described above. In the exemplary embodiments, a processing element may be trained by providing it with a large sample of data with known characteristics or features, e.g., effectiveness of security measures, impact of known vulnerabilities, etc.

In certain aspects, the training module 224 may employ unsupervised learning, which involves finding meaningful relationships in unorganized data. Unlike supervised learning, unsupervised learning does not involve user-initiated training based upon example inputs with associated outputs. Rather, in unsupervised learning, the training module 224 may organize unlabeled data according to a relationship determined by at least one ML method/algorithm, for example, the data security scoring model 180, employed by the analysis module 226. Unorganized data may include any combination of data inputs and/or ML outputs as described above.

In some aspects, the training module 224 may employ reinforcement learning, which involves optimizing outputs based upon feedback from a reward signal. Specifically, the training module 224 may receive a user-defined reward signal definition, receive a data input, utilize a decision-making model to generate the ML output based upon the data input, receive a reward signal based upon the reward signal definition and the ML output, and alter the decision-making model to receive a stronger reward signal for subsequently generated ML outputs. Other types of ML may also be employed, including deep or combined learning techniques.

The training module 224 may receive labeled data at an input layer of a model having a networked layer architecture (e.g., an artificial neural network, a convolutional neural network, etc.) for training the one or more ML models. The received data may be propagated through one or more connected deep layers of the ML model (e.g., security layer and ethics layer) to establish weights of one or more nodes, or neurons, of the respective layers. Initially, the weights may be initialized to random values, and one or more suitable activation functions may be chosen for the training process. The present techniques may include training a respective output layer of the one or more ML models. The output layer may be trained to output a prediction, for example.

In supervised machine learning described above, a processing element may be provided with example inputs and their associated outputs and may seek to discover a general rule that maps inputs to outputs, so that when subsequent novel inputs are provided, the processing element may, based upon the discovered rule, accurately predict the correct or a preferred output. In unsupervised machine learning described above, the processing element may be required to find its own structure in unlabeled example inputs. These techniques may be followed by reinforced or reinforcement learning techniques.

After training, the analysis module 226, using the data security scoring model 180, may be used to evaluate the data security data for the entity 104. For example, the analysis module 226 may apply security data, e.g., data security factors 202, collected for the entity 104 to the data security scoring model 180. The data security factors 202 may include data security, retention, and storage policies. The data security factors 202 may include the type of the data 120 (e.g., PII, financial, etc.) and sensitivity of the data 120. The data security factors 202 may include identified vulnerabilities and vulnerability scoring. The data security factors 202 may include historic security data, for example, number of data breaches for the entity 104. The data security factors 202 may include data ethics information (e.g., data sharing policies and procedures, data retention policies and procedures, etc.) for the entity 104.

The analysis module 226 may operate to determine one or more data security scores for the entity 104 using the data security scoring model 180. The analysis module 226 operates to apply the data security factors 202 received via the network 106 to the data security scoring model 180 and output a data security score based upon the algorithms of the data security scoring model 180. The data security scoring model 180 may weight each of the data security factors for the entity generate the data security score. The data security scoring model 180 may include artificial intelligence and machine learning to improve the data security scoring.

The analysis module 226 may employ various algorithms and/or machine-learning (ML) techniques in the data security scoring model 180 that analyze the test data and determine the security score for the entity 104. In some embodiments, at least one of a plurality of ML methods and algorithms may be applied by the analysis module 226, which may include, but are not limited to: linear or logistic regression, instance-based algorithms, regularization algorithms, decision trees, Bayesian networks, cluster analysis, association rule learning, artificial neural networks, deep learning, combined learning, reinforced learning, dimensionality reduction, and support vector machines. In various embodiments, the implemented ML methods and algorithms may be directed toward at least one of a plurality of categorizations of ML, such as supervised learning, unsupervised learning, and reinforcement learning. In one aspect, the ML based algorithms may be included as a library or package executed on the data security evaluation system 102. For example, libraries may include the TensorFlow based library, the PyTorch library, the HuggingFace library, and/or the scikit-learn Python library.

The analysis module 226 may comprise a set of computer-executable instructions implementing the data security scoring model 180, which includes loading, configuration, initialization and/or operation functionality. The analysis module 226 may include instructions for storing trained models (e.g., the data security scoring model in the electronic database 112). As discussed, once trained, the one or more trained ML models, e.g., the data security scoring model 180, may be operated in inference mode, whereupon when provided with de novo input that the model has not previously been provided, the model may output one or more predictions, classifications, etc., as described herein.

The analysis module 226 operates to apply data security factors 202 for the entity 104 to the data security scoring model 180.

For example, the data security scoring model 180 may include a security layer that accepts, as an input, the security protocols, procedures, and methods of the entity 104, the identified vulnerabilities in the computer systems of the entity 104, the number of past data breaches for the entity 104, and the like. The security layer may output a security rating that represents a data security level of the entity 104. For example, the security rating may represent the likelihood the entity 104 may be subject to a data breach. The data security scoring model 180 may also include an ethics layer that receives, as input, the data sharing, retention, and/or storage protocols and procedures. The ethics layer may output an ethics rating that represents a data ethics level of the entity 104. For example, the ethics rating may represent the likelihood the entity 104 may retain and/or store sensitive data, share sensitive data with third parties, and the like. The data security scoring model 180 may combine the data security level and data ethics level to generate the data security score. For example, the data security score may be a combination of the data security level and data ethics level, each being weighting according to its importance.

Machine learning techniques have been developed that allow parametric or nonparametric statistical analysis of large quantities of data. Such machine learning techniques may be used to automatically identify relevant variables (i.e., variables having statistical significance or a sufficient degree of explanatory power) from data sets. This may include identifying relevant variables or estimating the effect of such variables that indicate actual observations in the data set. This may also include identifying latent variables not directly observed in the data, viz. variables inferred from the observed data points.

The analysis module 226 may operate to output as a ML output the data security score. For example, the analysis module 226 may output the data security score via an interface 160. The interface 160 may be a graphical user interface, a webpage, and the like, accessible via the network 106. The interface 160 may display the data security score, the data security factors, and an explanation of the data security factors to the data security score. The analysis module 226 may also provide a link, reference, or widget that may direct other users (e.g., customers, clients, etc.) to the interface 160.

The security score may be any alphanumeric score that represents the data security of the entity 104. For example, the data security score may include grade rankings:

A+: indicating that the entity 104 adheres to some of the most stringent data laws in the country, for example, the California Consumer Protection Act (CCPA) and has not had a data leak in the last 10 years. The entity 104 has passed independent web data scans for leaks.

A: indicating that the entity 104 partially adheres to CCPA and has not had a verifiable data leak in the last 5 years. The entity 104 has passed independent web data scans for leaks.

B: indicating that the entity adheres to the CCPA and has one (1) verifiable data leak in the last 5 years.

B−: indicating that indicating that the entity 104 partially adheres to CCPA and has one (1) verifiable data leak in the last 5 years.

C: indicating that the entity adheres to the CCPA and had between two (2)-five (5) verifiable data leaks in the last 5 years.

C−: indicating that indicating that the entity 104 partially adheres to CCPA and had between two (2)-five (5) verifiable data leaks in the last 5 years.

D: indicating that the entity does not adhere to the CCPA or had more than five (5) verifiable data leaks in the last 5 years.

F: indicating that the entity does not adhere to the CCPA and had more than five (5) verifiable data leaks in the last 5 years.

While the above describes a "letter" score output by the analysis module 226, the analysis module 226 may output the data security score in any format. For example, the analysis module 226 may output a numerical score, e.g., 0 to 100, where a higher numerical value represents higher data protection and security, for example, adherence to data privacy standards, vulnerability scanning, robust network and data security measures, little or no data breaches, and the like.

Aspects described herein may include automated machine learning to determine data risk levels, identify relevant data risk factors, and evaluate the data security factors. Although the methods described elsewhere herein may not directly mention machine learning techniques, such methods may be read to include such machine learning for any determination or processing of data that may be accomplished using such techniques. In some embodiments, such machine-learning techniques may be implemented automatically upon occurrence of certain events or upon certain conditions being met. Use of machine learning techniques, as described herein, may begin with training a machine learning program, or such techniques may begin with a previously trained machine learning program.

Additionally or alternatively, the machine learning programs may be trained by inputting sample data sets or certain data into the programs, such as data security factors discussed herein. The machine learning programs may utilize deep learning algorithms that are primarily focused on pattern recognition and may be trained after processing multiple examples. The machine learning programs may include Bayesian program learning (BPL), voice recognition and synthesis, image or object recognition, optical character recognition, and/or natural language processing, either individually or in combination. The machine learning programs may also include natural language processing, semantic analysis, automatic reasoning, and/or machine learning.

It will be understood that the above disclosure is one example and does not necessarily describe every possible embodiment. As such, it will be further understood that alternate embodiments may include fewer, alternate, and/or additional steps or elements.

While FIG. 2 shows only one data security evaluation system 102, it is understood that many computer systems may operate the data security evaluation system 102 that are in remote communication with network 106. Additionally, while FIG. 2 shows only one database 108, and it is understood that many servers and/or databases may be included.

Figure 3:
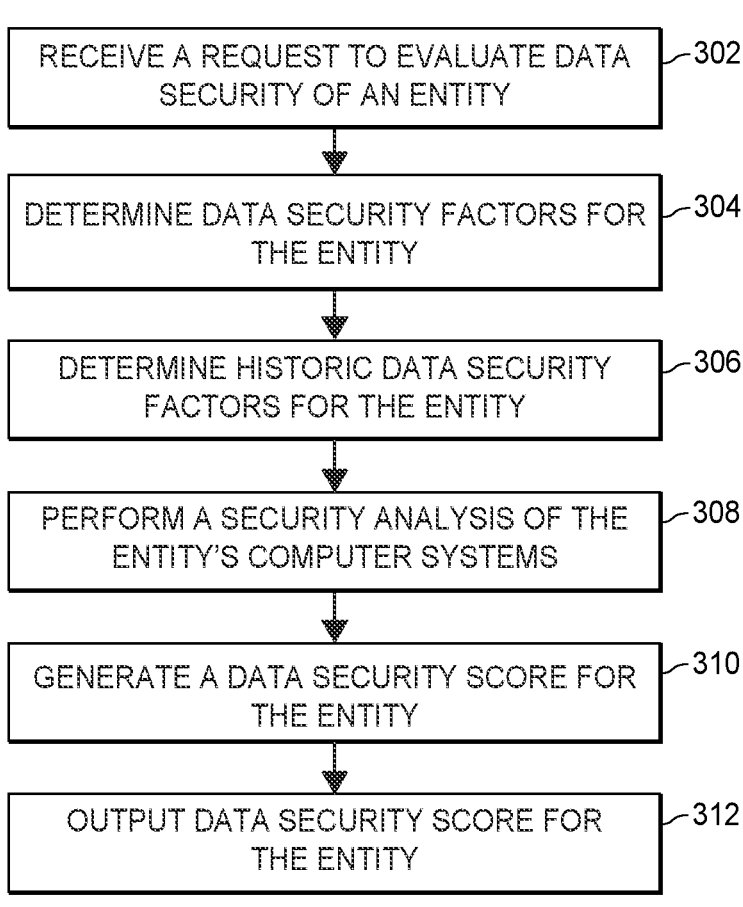
FIG. 3 depicts a flow diagram representing an exemplary computer-implemented method for evaluating data security of networked computer systems.

FIG. 3 is a flow diagram of an exemplary computer-implemented method 300 for analyzing security data for an entity. The method 300 may be implemented by one or more processors of a computing system such as a computing device representing the data security evaluation system 102. Alternatively or additionally, the method 300 may be implemented by one or more processors of a distributed system such as system 200 and/or various components of system 200 as described with regard to FIGS. 1 and/or 2 above, or otherwise implemented by one or more local or remote processors, servers, sensors, transceivers, memory units, wearables, smart contacts, smart glasses, virtual reality headsets, augmented reality glasses or headsets, mixed or extended reality headsets or glasses, voice or chat bots, generative AI, and/or other electronic or electrical components, including those mentioned elsewhere herein.

At block 302, a request may be received to evaluate data security of an entity. For example, the entity 104 may request that the data security evaluation system 102 access the data security of the entity computer systems and generate a data security score. The entity 104 may send the request via the network 106. The entity 104 may sent the request via the interface 160. The entity 104 may make the request via an application programming interface (API). In some implementations, the request may be provided, for example to a voice bot or a chatbot, in a natural language format.

At block 304, data security factors for the entity may be determined. For example, the data security evaluation system 102 may request the data security factors from the entity 104. The data security evaluation system 102 may request the data security factors from a security firm, e.g., the security firm 140. The data security evaluation system 102 may scan and/or examine the entity's computer systems to determine the data security factors. The security details may include identification and details of the entity's computer systems, identification of security protocols, methods and systems, user with access to the entity's computer systems, data ethics for the entity, and the like.

At block 306, a historic data security factors for the entity may be determined. For example, the data security evaluation system 102 may request that the entity 104 provide a history of the data security. The data security evaluation system 102 may communicate with the public information systems 130 and the standard organizations 150 to acquire the history.

The history may include information relating the past data security issues for the entity. For example, the history may include the number of data breaches during a period of time, customer or professional rating of the entity 104, governmental violations related to data security by the entity 104, and the like.

At block 308, a security analysis of the entity's computer system may be performed. For example, the data security evaluation system 102 may scan the entity's computer systems to determine the security measures and vulnerabilities of the entity's computer systems. The data security evaluation system 102 and/or the entity 104 may request the security firms 140 scan the entity's computer systems to determine the security measures and vulnerabilities of the entity's computer systems.

At block 310, a data security score may be generated for the entity. For example, the data security evaluation system 102 may apply the data security factors to the data security scoring model 180 to determine the data security score for the entity 104. The data security scoring model 180 may operate to receive, as input, the data security factors received via the network 106 and output a data security score based upon the algorithms of the data security scoring model 180. The data security scoring model 180 may weight each of the data security factors for the entity generate the data security score. The data security scoring model 180 may include artificial intelligence and machine learning to improve the data security scoring. The data security scoring model 180 may be trained using historic data security factors.

The data security score may be any alphanumeric score that represents the data security of the entity 104. For example, the data security score may include grade rankings:

A+: indicating that the entity 104 adheres to some of the most stringent data laws in the country, for example, the California Consumer Protection Act (CCPA) and has not had a data leak in the last 10 years. The entity has passed independent web data scans for leaks.

A: indicating that the entity 104 partially adheres to CCPA and has not had a verifiable data leak in the last 5 years.

B: indicating that the entity adheres to the CCPA and has one (1) verifiable data leak in the last 5 years.

B−: indicating that indicating that the entity 104 partially adheres to CCPA and has one (1) verifiable data leak in the last 5 years.

C: indicating that the entity adheres to the CCPA and had between two (2)-five (5) verifiable data leaks in the last 5 years.

C−: indicating that indicating that the entity 104 partially adheres to CCPA and had between two (2)-five (5) verifiable data leaks in the last 5 years.

D: indicating that the entity does not adhere to the CCPA or had more than five (5) verifiable data leaks in the last 5 years.

F: indicating that the entity does not adhere to the CCPA and had more than five (5) verifiable data leaks in the last 5 years.

At block 312, the data security score may be output. For example, the data security evaluation system 102 may output the data security score in the interface 160. The interface 160 may be a graphical user interface, a webpage, and the like. The interface 160 may be accessible via the network 106. For example, the entity 104 may access the data security score via the interface 160. The interface 160 may display the data security score, the data security factors, and an explanation of the data security factors to the data security score. The data security evaluation system 102 may also provide a link, reference, or widget that may direct other users (e.g., customers, clients, etc.) to the interface 160. In some implementations, the data security score may be output for example, by a voice bot or a chatbot, in a natural language format. For example, the output may be "Entity XYZ's data security is excellent! Entity XYZ received an A+ rating."

The following considerations also apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

Unless specifically stated otherwise, discussions herein using words such as "processing," "computing," "calculating," "determining." "presenting." "displaying." or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising." "includes," "including." "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

In addition, use of "a" or "an" is employed to describe elements and components of the embodiments herein. This is done merely for convenience and to give a general sense of the invention. This description should be read to include one or at least one and the singular also may include the plural unless it is obvious that it is meant otherwise.

Upon reading this disclosure, those of skill in the art will appreciate still additional alternative structural and functional designs for providing feedback to owners of properties, through the principles disclosed herein. Therefore, while particular embodiments and applications have been illustrated and described, it is to be understood that the disclosed embodiments are not limited to the precise construction and components disclosed herein. Various modifications, changes, and variations, which will be apparent to those skilled in the art, may be made in the arrangement, operation and details of the method and apparatus disclosed herein without departing from the spirit and scope defined in the appended claims.

The patent claims at the end of this patent application are not intended to be construed under 35 U.S.C. § 112 (f) unless traditional means-plus-function language is expressly recited, such as "means for" or "step for" language being explicitly recited in the claim(s). The systems and methods described herein are directed to an improvement to computer functionality and improve the functioning of conventional computers.

What is claimed:

1. A computer-implemented method for evaluating data security, the computer-implemented method comprising:

receiving, by one or more processors, a request to evaluate data security operations of one or more computer systems of an entity that have access to private data of one or more users;

masking, by the one or more processors, owners of the private data from a user requesting to evaluate the data security operations of the entity;

determining, by the one or more processors, one or more data security factors for the entity describing storage, security, and sharing of the private data by the entity;

generating, by the one or more processors, a data security score based upon the data security factors using a data security model having a security layer and an ethics layer, wherein the data security model is trained to i) generate, via the security layer, a security rating representing a likelihood the entity is subject to a data breach using known security ratings for entities assigned to sets of security protocols for the entities, ii) generate, via the ethics layer, an ethics rating representing a likelihood the entity retains, stores, or shares the private data without consent using known ethics ratings for the entities assigned to sets of data sharing, retention, and storage protocols for the entities, and iii) combine the security rating and ethics rating to generate the data security score by assigning weights to the security rating and the ethics rating according to importance; and outputting, by the one or more processors using a large language model (LLM), a natural language response to the request to evaluate the data security operations of the entity including an explanation of the data security score and a recommendation on how to improve the data security score, wherein the LLM is fine-tuned by training the LLM using historical data security scores and ranked lists of explanations of each historical data security score.

2. The computer-implemented method of claim 1, wherein the data security factors comprise one or more of a history of data breaches for the entity, a history of compliance with data security standards, a vulnerability scan of the one or more computer systems having access to the private data of the one or more users, data security protocols of the entity, and sensitive of the private data.

3. The computer-implemented method of claim 2, further comprising:

performing a vulnerability scan of the one or more computer systems having access to the private data.

4. The computer-implemented method of claim 2, further comprising:

requesting the data security protocols of a third-party security firm; and requesting that the third-party security firm perform the vulnerability scan of the one or more computer systems having access to the private data.

5. The computer-implemented method of claim 2, further comprising:

searching publicly available information sources for the history of data breaches for the entity.

6. The computer-implemented method of claim 2, further comprising:

requesting, for a third-party organization, the history of compliance with data security standards.

7. The computer-implemented method of claim 1, further comprising:

generating a network link to the data security score.

8. A computer system for evaluating data security, the computer system comprising:

one or more processors;

a communication unit; and a non-transitory computer-readable medium coupled to the one or more processors and the communication unit and storing instructions thereon that, when executed by the one or more processors, cause the computer system to:

receive a request to evaluate data security operations of one or more computer systems of an entity that have access to private data of one or more users;

mask owners of the private data from a user requesting to evaluate the data security operations of the entity;

determine one or more data security factors for the entity, wherein the one or more data security factors describe storage, security, and sharing of the private data by the entity;

generate a data security score based upon the data security factors using a data security model having a security layer and an ethics layer, wherein the data security model is trained to i) generate, via the security layer, a security rating representing a likelihood the entity is subject to a data breach using known security ratings for entities assigned to sets of security protocols for the entities, ii) generate, via the ethics layer, an ethics rating representing a likelihood the entity retains, stores, or shares the private data without consent using known ethics ratings for the entities assigned to sets of data sharing, retention, and storage protocols for the entities, and iii) combine the security rating and ethics rating to generate the data security score by assigning weights to the security rating and the ethics rating according to importance; and output, using a large language model (LLM), a natural language response to the request to evaluate the data security operations of the entity including an explanation of the data security score and a recommendation on how to improve the data security score, wherein the LLM is fine-tuned by training the LLM using historical data security scores and ranked lists of explanations of each historical data security score.

9. The computer system of claim 8, wherein the data security factors comprise one or more of a history of data breaches for the entity, a history of compliance with data security standards, a vulnerability scan of the one or more computer systems having access to the private data of the one or more users, data security protocols of the entity, and sensitive of the private data.

10. The computer system of claim 9, wherein the instructions, when executed by the one or more processors, cause the computer system to:

perform vulnerability scan of the one or more computer systems having access to the private data.

11. The computer system of claim 9, wherein the instructions, when executed by the one or more processors, cause the computer system to:

request the data security protocols of a third-party security firm; and request that the third-party security firm perform the vulnerability scan of the one or more computer systems having access to the private data.

12. The computer system of claim 9, wherein the instructions, when executed by the one or more processors, cause the computer system to:

search publicly available information sources for the history of data breaches for the entity.

13. The computer system of claim 9, wherein the instructions, when executed by the one or more processors, cause the computer system to:

request, for a third-party organization, the history of compliance with data security standards.

14. The computer system of claim 8, wherein the instructions, when executed by the one or more processors, cause the computer system to:

generate a network link to the data security score.

15. A tangible, non-transitory computer-readable medium storing instructions for data security evaluation that, when executed by one or more processors of a computing device, cause the computing device to:

receive a request to evaluate data security operations of one or more computer systems of an entity that have access to private data of one or more users;

mask owners of the private data from a user requesting to evaluate the data security operations of the entity;

determine one or more data security factors for the entity, wherein the one or more data security factors describe storage, security, and handling of the private data by the entity;

generate a data security score based upon the data security factors using a data security model having a security layer and an ethics layer, wherein the data security model is trained to i) generate, via the security layer, a security rating representing a likelihood the entity is subject to a data breach using known security ratings for entities assigned to sets of security protocols for the entities, ii) generate, via the ethics layer, an ethics rating representing a likelihood the entity retains, stores, or shares the private data without consent using known ethics ratings for the entities assigned to sets of data sharing, retention, and storage protocols for the entities, and iii) combine the security rating and ethics rating to generate the data security score by assigning weights to the security rating and the ethics rating according to importance; and output, using a large language model (LLM), a natural language response to the request to evaluate the data security operations of the entity including an explanation of the data security score and a recommendation on how to improve the data security score, wherein the LLM is fine-tuned by training the LLM using historical data security scores and ranked lists of explanations of each historical data security score.

16. The tangible, non-transitory computer-readable medium of claim 15, wherein the data security factors comprise one or more of a history of data breaches for the entity, a history of compliance with data security standards, a vulnerability scan of the one or more computer systems having access to the private data of the one or more users, data security protocols of the entity, and sensitive of the private data.

17. The tangible, non-transitory computer-readable medium of claim 16, wherein the instructions, when executed by the one or more processors, cause the computer device to:

perform vulnerability scan of the one or more computer systems having access to the private data.

18. The tangible, non-transitory computer-readable medium of claim 16, wherein the instructions, when executed by the one or more processors, cause the computer device to:

request the data security protocols of a third-party security firm; and request that the third-party security firm perform the vulnerability scan of the one or more computer systems having access to the private data.

19. The tangible, non-transitory computer-readable medium of claim 16, wherein the instructions, when executed by the one or more processors, cause the computer device to:

search publicly available information sources for the history of data breaches for the entity.

20. The tangible, non-transitory computer-readable medium of claim 16, wherein the instructions, when executed by the one or more processors, cause the computer device to:

request, for a third-party organization, the history of compliance with data security standards.

21. The tangible, non-transitory computer-readable medium of claim 15, wherein the instructions, when executed by the one or more processors, cause the computer device to:

generate a network link to the data security score.

* * * * *